United States Patent [19]

Henry et al.

[11] Patent Number: 5,553,518
[45] Date of Patent: Sep. 10, 1996

[54] INDUSTRIAL TOOL FOR FORMING METAL HAVING A THERMOPLASTIC HONEYCOMB CORE

[75] Inventors: Rebecca D. Henry, Holt; William Livingston, Eaton Rapids, both of Mich.

[73] Assignee: Akemi, Inc., Eaton Rapids, Mich.

[21] Appl. No.: 278,619

[22] Filed: Jul. 21, 1994

[51] Int. Cl.⁶ .................................................. B29C 39/00
[52] U.S. Cl. .................................... 76/107.1; 72/297
[58] Field of Search ............................... 76/101.1, 107.1, 76/107.4; 72/295–297, 476; 428/126; 264/246, 247, 271.1, 292; 156/245

[56] References Cited

U.S. PATENT DOCUMENTS

| | | |
|---|---|---|
| 1,416,412 | 5/1922 | Pack . |
| 2,061,300 | 11/1936 | Daniels . |
| 2,459,132 | 1/1949 | Nielson ..................................... 72/292 |
| 2,836,530 | 5/1958 | Rees . |
| 3,152,385 | 10/1964 | Wheildon, Jr. et al. . |
| 3,640,798 | 2/1972 | Deeds . |
| 3,861,936 | 1/1975 | Winter . |
| 3,879,245 | 4/1975 | Fetherston et al. . |
| 3,995,984 | 12/1976 | Fetherston et al. . |
| 4,203,690 | 5/1980 | Tanaka et al. . |
| 4,323,623 | 4/1982 | Ahrens et al. . |
| 4,509,358 | 4/1985 | Krowl . |
| 4,584,041 | 4/1986 | Lyman et al. . |
| 4,748,088 | 5/1988 | Billgren . |
| 4,853,065 | 8/1989 | Terry et al. . |
| 5,021,282 | 6/1991 | Terry et al. . |
| 5,077,887 | 1/1992 | Holloway . |
| 5,087,500 | 2/1992 | Kasper et al. . |
| 5,119,535 | 6/1992 | Gnagy et al. . |
| 5,141,400 | 8/1992 | Murphy et al. . |
| 5,154,963 | 10/1992 | Terry . |
| 5,238,725 | 8/1993 | Effing et al. . |
| 5,247,861 | 9/1993 | Jahn . |
| 5,262,113 | 12/1993 | Carmien ................................ 264/271.1 |

*Primary Examiner*—Douglas D. Watts
*Attorney, Agent, or Firm*—Brooks & Kushman PC

[57] ABSTRACT

A method of manufacturing a tool which comprises preparation of a thermoplastic honeycomb core. The honeycomb core is suspended within a mold. The method also comprises pouring a thermosetting medium between the core and the mold to form the tool and removing the tool from the mold.

10 Claims, 3 Drawing Sheets

INDUSTRIAL TOOL FOR FORMING METAL HAVING A THERMOPLASTIC HONEYCOMB CORE

TECHNICAL FIELD

The present invention relates to the use of a thermoplastic honeycomb core encapsulated in a formulated epoxy system to make an industrial tool, such as a stretch forming tool for forming metal. Such forming tools may be used as beating blocks, rubber press tools, and drop-hammer tools which are used in the production of components from sheet metal and other materials.

BACKGROUND ART

Tools for shaping objects have long been made with a core of some type to reduce weight and cost. Typical are those which use ceramic beads mixed with an epoxy matrix, or nut shells mixed with an epoxy matrix, or a polyester system which is formed to the desired configuration.

Each of the prior art approaches calls for a core which is still lower in weight. For example, the core weights per cubic foot of the prior art approaches are ceramic bead core—32 lbs; walnut shell core—102 lbs; and foamed polyester systems—55 lbs.

In addition to the desirability of still further reductions in core weight is the manufacturing criterion of ease of construction. Ideally, it should not be necessary to build a mold for casting a core. It would be desirable if a core could be produced independently of and simultaneously with construction of the mold for the finished tool.

Illustrative of prior art approaches is U.S. Pat. No. 2,836,530, which discloses a core with a thermosetting resin as a binder with a filler material such as sand or walnut shells. However, problems of dimensional accuracy may remain.

U.S. Pat. No. 3,861,936 discloses a plastic tooling method and apparatus for producing a master tooling model by extruding a layer of carvable epoxy resin at a uniform thickness upon a pre-constructed base. In addition to problems of dimensional stability, the resulting tool requires machining to produce a near net shape. Also, equipment is required for the metering, mixing, and extruding steps.

U.S. Pat. No. 5,247,861 discloses a method of producing laminated plastic tooling suitable for use in forming board material by techniques such as stretch forming and hydroforming. The method uses a stacked array of plastic boards which are cut to selected lengths and laid up in a pattern representing the desired tool configuration. A machining step is required to produce the final configuration. Disclosed as typical plastic materials include epoxy, polyurethane, or any other thermosetting or thermoplastic material or mixtures of materials having the requisite characteristics. The board materials may include a filler having a suitable shape. Nevertheless, design challenges represented by still further weight reduction are substantially unmet.

Accordingly, there appears a continuing need for improved methods of manufacturing tools for use in forming large sheets of material, such as in the stretch forming of large metal panels.

DISCLOSURE OF INVENTION

The design challenges noted earlier and others are met by the method of this invention which comprises the steps of preparing a thermoplastic honeycomb core; suspending the core within a mold; pouring a thermosetting medium between the core and the mold to form a tool; and removing the tool from the mold.

Unless the tool surface is damaged, or a dimensional modification is desired, there is no need to machine the resulting tool, since it is prepared in a net shape.

The resulting tool uses thermoplastic honeycomb core materials which have the desired machining characteristics and strength. Relatively inexpensive to manufacture, the resulting tool may be modified or repaired and has a long production life.

BRIEF DESCRIPTION OF DRAWINGS

Details of the invention, and certain preferred embodiments thereof, will be further understood upon reference to the drawing, therein.

DETAILED DESCRIPTION OF PREFERRED EMBODIMENTS

Figure 1:
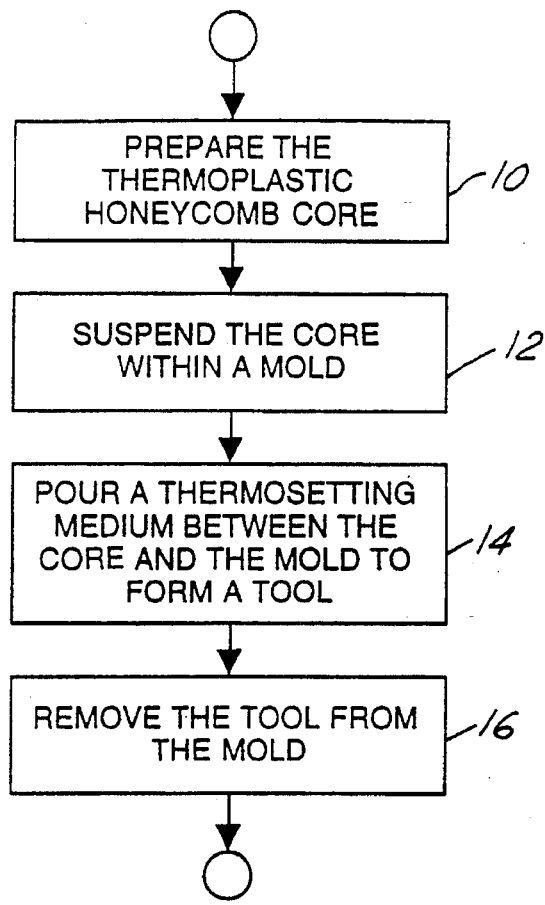
FIG. 1 is a block diagram illustrating the main method steps of the present invention.
Figure 2:
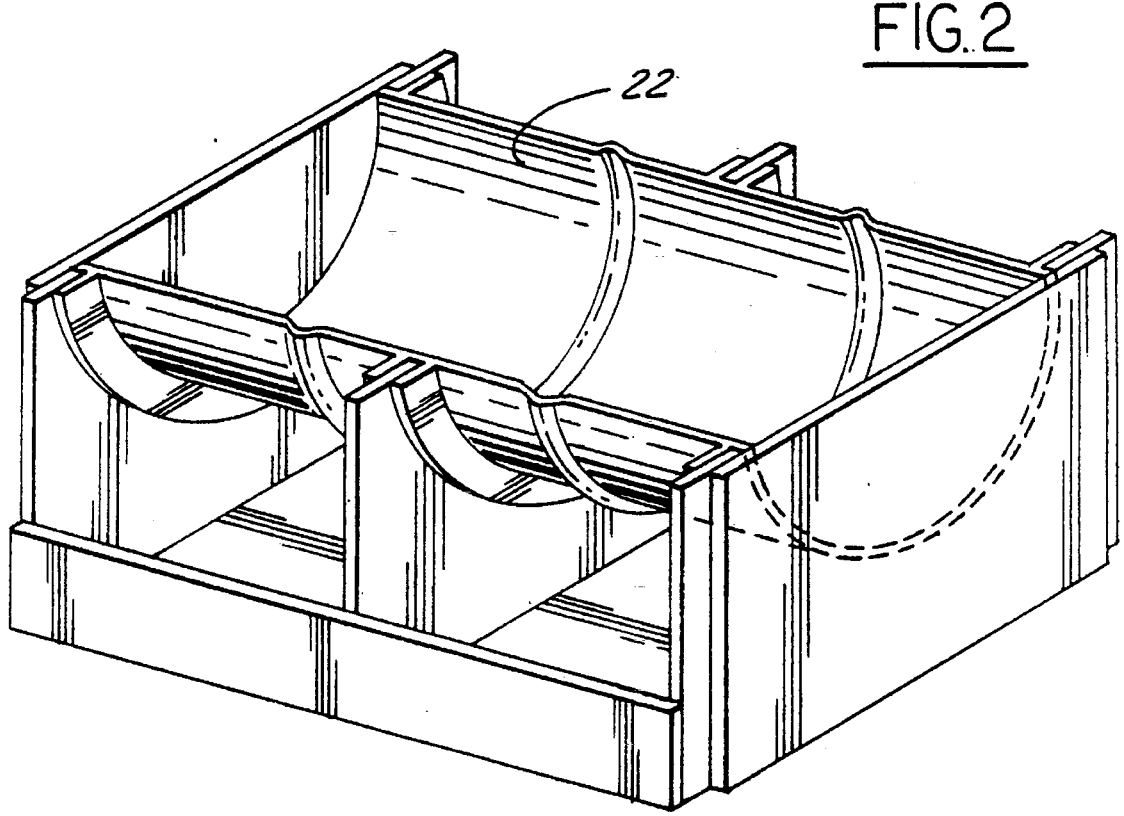
FIG. 2 is a schematic perspective view of a mold prior to suspending the core therewithin.
Figure 3:
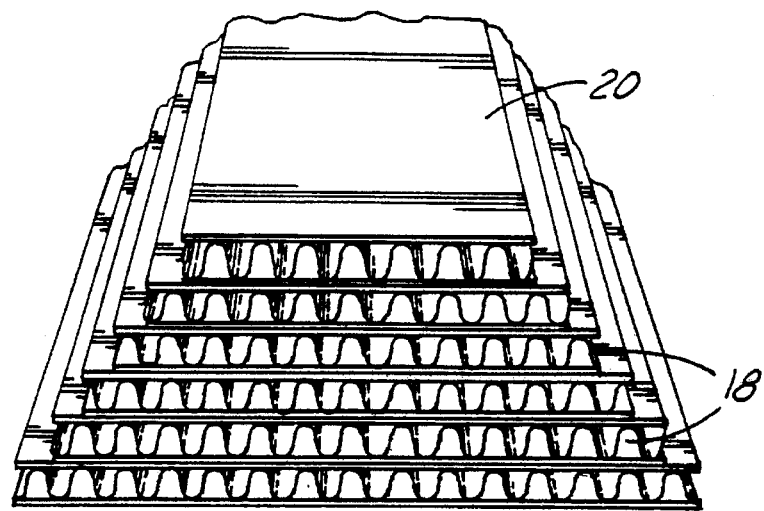
FIG. 3 is a schematic perspective view of the core of assembled sheets which are formed of a thermoplastic honeycomb.
Figure 4:
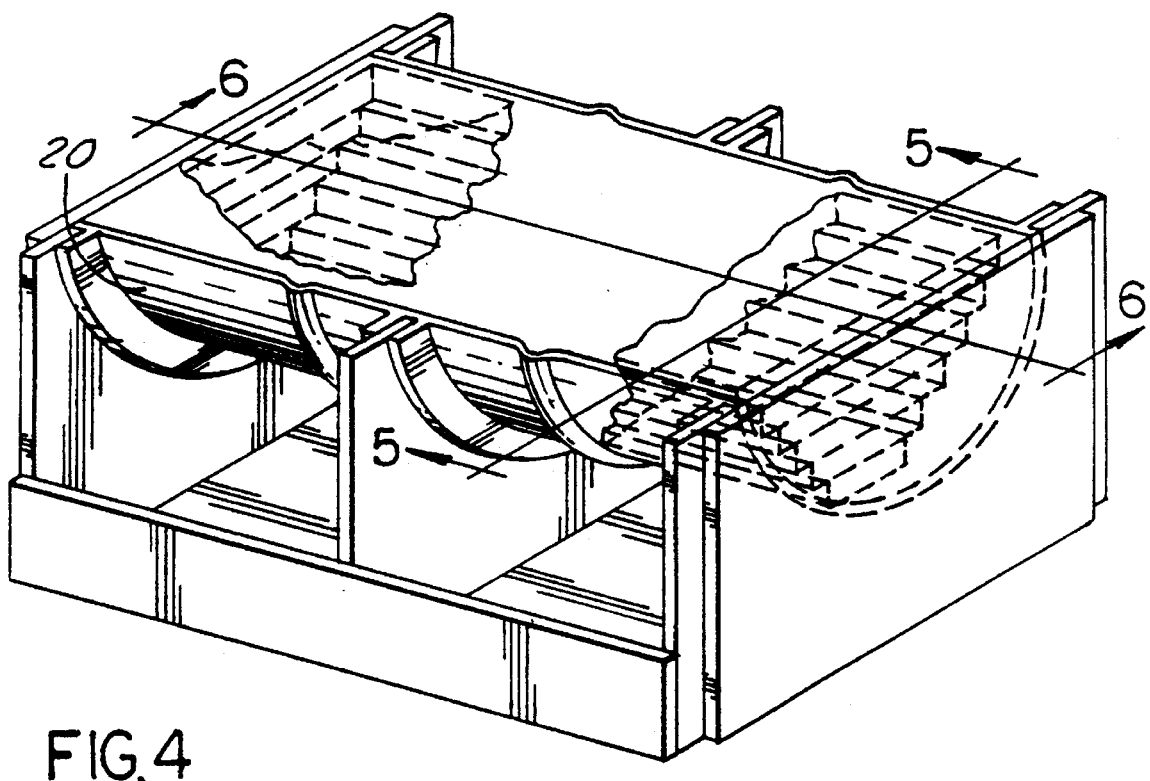
FIG. 4 is a schematic perspective view of the mold within which the core is suspended.
Figure 5:
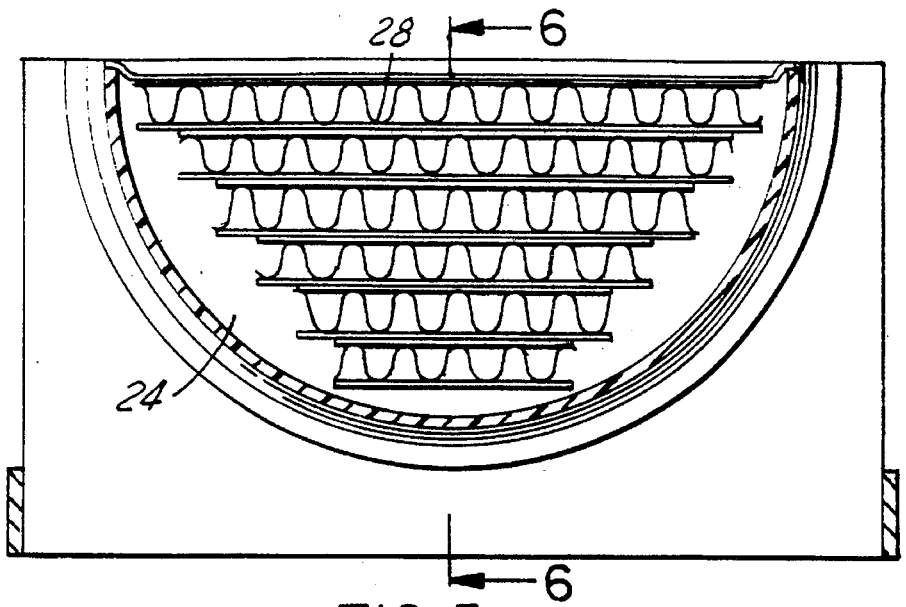
FIG. 5 is a cross sectional view taken along the line 5—5 of FIG. 4.
Figure 6:
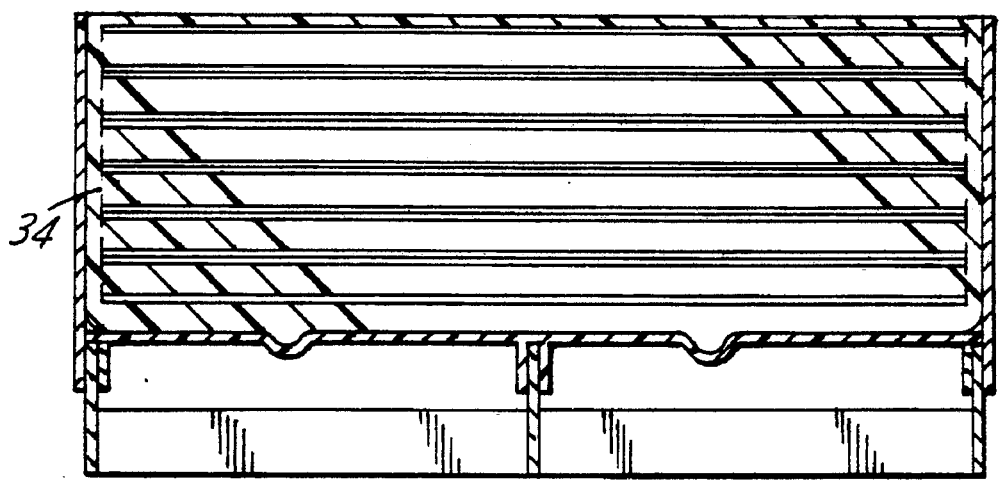
FIG. 6 is a cross sectional view taken along the line 6—6 of FIG. 4.
Figure 7:
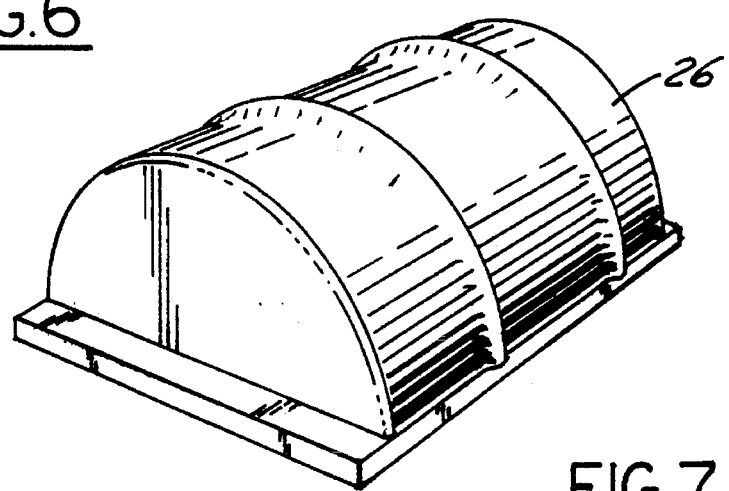
FIG. 7 is a perspective view of the resulting tool.

Referring now to FIG. 1 there is depicted a block diagram illustrating the main method steps of the present invention. The main steps are: preparing 10 a thermoplastic honeycomb core; suspending 12 the core within a mold; pouring 14 a thermosetting medium between the core and the mold to form a tool; and removing 16 the tool from the mold.

Turning now to FIGS. 2–7, a plurality of thermoplastic honeycomb sheets 18 are cut to given lengths and configured in a pattern having outer dimensions which are less than the dimensions of the tool 26 to be formed.

The sheets 18 are cut to the desired dimensions from standard large sheets. Where the desired tool is long or large, shorter sheets 18 may be adhesively bonded in an abutting relationship to give the required overall length.

To produce a tool such as that needed to stretch form a shape similar to a 50-gallon oil drum, a stacked array of sheets or core 20 is assembled which looks like a model of a Mayan ruin. The density of the honeycomb core is only about 14 lbs. per cubic foot, which is significantly less than all known previous approaches. The strong lightweight honeycomb core 20 enables a tool 26 to be fabricated which is strong, and yet light.

The stacked array of sheets 18 comprise the core 20. The core 20 is then inverted and suspended within a mold 22, the inner surface of which will ultimately define the outer surface of the tool to be formed. After suspension, a thermosetting medium is poured into the cavity 24 defined between the mold 22 and the core 20. After curing, a tool 26 defined by the now thermoset medium is produced.

Preferably, the thermoplastic honeycomb core is made from a product sold under the name NorCore® by the Norfield Corporation of Danbury, Conn. The material has resistance to warping. It will be appreciated that a variety of thermoplastics may be used, such as ABS, polystyrene, and polycarbonate. Sheet thickness ranges between ¼ inch and 4 inches. Extremely light in weight, the sheets 18 offer exceptional strength, rigidity, resistance to warping, and dimensional stability. In one example, the inventors used a starting thickness of 0.187 inches for the sheet 18. Its normal thickness was 1 inch which represents the thickness of the finished core. The maximum load at failure was 244.2 lbs. Its flexural strength was 1,221 psi. The Norfield Data Bulletin No. 508 is incorporated here by reference.

To bond the sheets 18 together to form the core 20, a suitable adhesive may be used, such as a fiberglass cloth impregnated with an epoxy such as Akalam 2103. In step 14 (FIG. 1), the thermosetting medium which is poured between the core 20 and the mold 22 is ideally a low toxicity epoxy resin system designed for casting applications. The thermosetting medium should have a room temperature curing system for use at ambient conditions. Suitable casting systems are Akacast 2310, 2308, 2350, and 2360 (available from AKEMI of Eaton Rapids, Mich.). Similar comments are applicable to the Akacast 2350 product, which is a formulated epoxy system designed to have favorable machining characteristics for producing tools and dies without the need for a master model. That product bulletin is also incorporated here by reference.

Preferably, the mold 22 is made of an epoxy laminate material.

Most preferably, the sheets 18 are about 1 inch thick. They are made from a polycarbonate with a starting sheet thickness of about ⅜ inch. A splash was made using Akaface 2203 and Akalam 2103 formed around a 30 gallon drum in the form of a semi-cylindrical shape.

The sheets 18 were cut to stack into a pyramid shape to form a core 20 for the tool. The layers were adhered together using Akaface 2103 and fiberglass. The core was suspended so that the lower sheet 30 was spaced about 1 inch from the bottom and sides 32, 34 of the splash.

The Akacast 2350 product (an epoxy casting resin) was used to encapsulate the core 20. About 80 lbs. of the Akacast 2350 epoxy casting resin were used to form a model which was 24 inches long. As noted earlier, the honeycomb has a density of about 15 lbs. per cubic foot and a compressive strength of about 500 psi, thus yielding an ultra light core.

A mechanical and chemical lock is formed when the epoxy is poured around the shaped core 20. The net shape so produced is dimensionally stable and has a low coefficient of thermal expansion.

If desired, the resulting tool 26 may be machined by computer-driven numerical control methods. The configuration of the tool may be checked on a conventional coordinate measuring machine.

Alternatively, the tool may be treated with any suitable coating. Such coatings include low friction coatings such as Teflon filled epoxy, or other coatings such as water-based acrylic or urethane.

While certain preferred arrangements, shapes, and materials were detailed in the above description, those may be varied. For example, concave and convex shapes and combinations thereof may be combined. Other variations and applications of this invention will occur to those skilled in the art. Such are intended to be included within the scope of this invention as defined in the following claims.

We claim:

1. A method of manufacturing a tool, which comprises:

preparing a thermoplastic honeycomb core;

suspending the core within a mold;

pouring a thermosetting medium between the core and the mold to form a core encapsulated by the medium at room temperature; and removing the core encapsulated by the medium from the mold.

2. The method of claim 1, wherein the step of preparing the thermoplastic honeycomb core comprises:

assembling a plurality of plastic honeycomb sheets.

3. The method of claim 2, further comprising:

adhering the sheets together to form the honeycomb core.

4. The method of claim 1, wherein suspending the core within a mold comprises;

providing a cavity within the core and the mold into which the thermosetting medium is poured.

5. A method of manufacturing a tool, which comprises:

preparing a thermoplastic honeycomb core;

suspending the core within a mold;

pouring a thermosetting medium between the core and the mold to form the tool;

removing the tool from the mold; and machining the tool under computer control to a desired configuration.

6. A method of manufacturing a tool, which comprises:

preparing a thermoplastic honeycomb core;

suspending the core within a mold;

pouring a thermosetting medium between the core and the mold to form the tool;

removing the tool from the mold; and applying an anti-friction coating to the tool.

7. A method of manufacturing a tool, which comprises:

preparing a thermoplastic honeycomb core;

suspending the core within a mold;

pouring a thermosetting medium between the core and the mold to form the tool; and removing the tool from the mold, wherein the thermoplastic honeycomb core is prepared with sheets having a honeycomb structure disposed therewithin, adjacent sheets being adhered together by a two-component, amine-cured epoxy resin.

8. A tool for stretch forming an object, the tool comprising:

a thermoplastic honeycomb core, the core being comprised of plural honycomb pieces having a density of about 14–15 lbs. per cubic foot; and a thermoset medium encapsulating the core to define a surface of the tool.

9. The tool of claim 8, wherein the honeycomb core is comprised of a plurality of honeycomb sheets.

10. The tool of claim 9, further comprising an adhesive which bonds the sheets together to form the honeycomb core.

\* \* \* \* \*